United States Patent [19]

Backe et al.

[11] Patent Number: 4,531,367
[45] Date of Patent: Jul. 30, 1985

[54] CONTROL AND REGULATING MEANS FOR AN ADJUSTABLE HYDROSTATIC UNIT

[75] Inventors: Wolfgang Backe, Aachen; Franz Weingarten, Frechen; Hubertus Murrenhoff, Aachen, all of Fed. Rep. of Germany

[73] Assignee: Linde Aktiengesellschaft, Weisbaden, Del.X

[21] Appl. No.: 404,330

[22] Filed: Aug. 2, 1982

[30] Foreign Application Priority Data

Aug. 3, 1981 [DE] Fed. Rep. of Germany ....... 3130660

[51] Int. Cl.³ .............................................. F16D 33/02
[52] U.S. Cl. ...................................... 60/447; 60/448; 417/216
[58] Field of Search ................ 60/447, 448, 449, 452; 91/473; 417/216

[56] References Cited

U.S. PATENT DOCUMENTS 3,054,263 9/1962 Budzich et al. ...................... 60/449
3,650,108 3/1972 Isaac ..................................... 60/447
3,986,357 10/1976 Hoffmann ............................. 60/447
4,398,869 8/1983 Kirkham et al. ..................... 417/216

FOREIGN PATENT DOCUMENTS 0050462 4/1977 Japan ..................................... 60/444

Primary Examiner—Robert E. Garrett
Assistant Examiner—John M. Husar
Attorney, Agent, or Firm—Buell, Ziesenheim, Beck & Alstadt

[57] ABSTRACT

A control and regulating arrangement for an adjustable hydrostatic unit is provided in which the regulating device has an auxiliary control constant pump in the feed line of which there is a restrictor, in which case the pressure retained in front of the latter acts on a pressure chamber in which a regulating piston capable of sliding against the force of a spring and which influences the position of a regulating piston connected with the final control element of the hydrostatic unit and capable of sliding in a regulating cylinder is capable of sliding, characterized in that the unit is a hydrostatic motor and the auxiliary control pump is connected to its output shaft.

12 Claims, 8 Drawing Figures

CONTROL AND REGULATING MEANS FOR AN ADJUSTABLE HYDROSTATIC UNIT

This invention relates to control and regulating means for an adjustable hydrostatic unit and particularly to a control and regulating device for an adjustable hydrostatic unit, in which the control and regulating device has an auxiliary control pump, in the feed line of which a restrictor, preferably an adjustable restrictor, is located where the pressure retained in front of the latter acts on a piston capable of sliding against the force of a spring and influences the position of a regulating piston connected with the final control element of the hydrostatic unit and capable of sliding in a regulating cylinder. The control and regulating devices of this type known to date are used in connection with an adjustable hydrostatic pump as the adjustable hydrostatic unit, in which the auxiliary control constant pump is connected with the drive shaft of the pump (DE-AS No. 15 55 480). Such devices are frequently designated as "automotive controls". In most cases they are designed so that they regulate the pump a smaller stroke volume per revolution (maximum-load regulation) if its r.p.m. is diminished by an excessive torque absorption of the pump and thus avoid overloading of the driving internal combustion engine.

Hydrostatic systems are also known in which individual adjustable hydraulic motors are connected to a pressure main line in which as constant a pressure as possible is maintained and in which a relatively unrestricted stream can flow, relative to the consumer or consumers connected. Since an unrestricted stream flows to the hydraulic motor, the motor attains an unlimited high r.p.m. provided the torque at the motor output shaft is equal to or less than the torque absorbed by the driven consumer and resulting from its resistance. By regulating the stroke volume per revolution of the hydraulic motor, the ratio between pressure in the inflow line and the torque is modified. By adjusting the stroke volume per revolution it is thus possible to modify the torque at the output shaft at a given pressure in the inflow line and, provided the resistance of the driven consumer is speed-dependent, the r.p.m. can thus be determined at a given pressure in the inflow line by regulating the stroke volume per revolution. In these familiar systems the auxiliary control stream produced by the auxiliary control pump (tachogenerator) designed as a constant pump and which is proportional to the drive r.p.m. is compared with a second arbitrarily regulated control stream serving as a signal for the theoretical or rated r.p.m. and the difference in the values of the two streams is used to regulate the hydrostatic unit. This presents the disadvantages that a relatively large auxiliary control stream, which is fraught thus with correspondingly high energy losses, must be generated and that the pressures whose difference is to be assessed must be conveyed on both sides of the piston serving for regulation so that a pressure chamber is not available on either side for connecting a damping device or for super-imposing a signal pressure. With this design, however, we also have at least a relatively labile system due to the volumetric action of the differential streams, in which the pressure available for regulation drops at an r.p.m. of the hydrostatic unit that is rising relative to the rated r.p.m. ("Hydrostatic transport and winch drives with energy recovery" in O+P Ölhydraulik und Pneumatik 25 (3), 193 (1981)).

The invention proposes to improve the control and regulating device by which the output r.p.m. of an adjustable hydrostatic motor connected to a pressure main line with at least approximately constant pressure can be arbitrarily regulated to a definite value and set at the regulated value, in particular, to obtain a clear regulating signal, assure the possibility of connecting an additional control signal and providing damping devices, and to improve the regulation stability by avoiding regulation oscillations.

This problem is solved according to the invention in that in an arrangement of the type mentioned in the specification the hydrostatic unit mentioned there is a hydrostatic motor connected to a pressure main line with an at least approximately constant pressure and the auxiliary control pump is connected to its output shaft. The invention thus also concerns the application of a control and regulating device of the type mentioned in the specification for regulating a hydrostatic motor connected to a pressure main line, in which case the auxiliary control pump of this type is connected to the output shaft of this motor and thus concerns the application of the arrangement known in pumps as "automotive control" for regulating a motor, i.e., a secondary machine, in a "system with impressed pressure". The invention thus also concerns a control and regulating device for a hydrostatic motor connected to a pressure main line, to the output shaft of which motor an auxiliary control pump serving as a "tachogenerator" is connected, in which case according to the invention and as is known in itself a restrictor is located in the feed line of the auxiliary control pump and the pressure retained in front of this restrictor acts upon a piston that determines the position of the final control element of the hydraulic motor. The invention thus also concerns an adjustable motor to the output shaft of which an auxiliary control pump is connected, in a "system with impressed pressure", where the control and regulating device is constructed according to the principle of "automotive control" known for pumps.

Since the piston loaded by the pressure retained in front of the restrictor is capable of sliding against a spring in this system, the task of feeding in a second control signal besides the adjustability of the restrictor can be solved in this system in a simple and favorable manner by modifying either the pretension of this spring and/or designing the chamber in front of the piston on the pressure-spring side as a pressure chamber into which another control signal can be fed in the form of a control pressure.

With this type of control there is with increasing r.p.m. an increasing pressure head in front of the restrictor and thus an increasing regulation signal and thus a more favorable characteristic than would be attained by the comparison of two streams. The r.p.m. regulation of the hydraulic motor is thus reduced to a pressure regulation through the measuring pressure retained in front of the restrictor. One possibility of modifying the sign in the regulating circuit is, for example, offered by connecting the auxiliary control pump to the high-pressure level flowing to the hydraulic motor. An increase in the r.p.m. then signifies a decreasing measuring pressure because only a limited stream flows through the restrictor, but a greater stream is drawn by the auxiliary control pump. Another possibility of sign reversal is offered by interchanging the high-pressure connection with the low-pressure connection at the control valve, which influences the position of the regulating piston and whose regulating piston is influenced by the pressure in front of the restrictor.

If the stroke volume per revolution of the motor is increased only so far that the torque delivered at the shaft taking the pressure flowing in into account, corresponds to the torque that is absorbed by the mechanical energy consumer at the desired r.p.m., there is a removal of power from the pressure main line without undesirable throttling losses in the main line. A small auxiliary control stream at low pressure must be conveyed through a restrictor only for auxiliary control purposes. Besides the control losses, only the losses due to motor efficiency are involved in this arrangement. The basic concept of the invention is to provide the adjustable hydraulic motor with a regulating system that maintains its r.p.m. constant at an arbitrarily selected value, independent of the moment to be given and absorbed by the consumer and independent of a fluctuating pressure in the pressure main line, provided the fluctuations do not exceed certain limits. If the torque absorbed by the mechanical energy consumer becomes greater or if the pressure in the pressure main line becomes smaller, the r.p.m. of the motor thus drops within the regulation band width and thus the feed stream of the auxiliary control pump, so that a regulating signal is unleashed that leads to setting the hydraulic motor to a greater stroke volume per revolution and thus to a greater torque and thus increasing r.p.m., inversely in the case of a decreasing torque at the shaft of the energy consumer. If a torque is imparted to the hydraulic motor by the mechanical energy consumer, e.g., in a braking state, the motor is swung through the neutral position into the counterposition. The motor thus becomes a pump and returns a volume stream into the pressure main line. Thus, power can also be fed back into the pressure main line by the unit driven as a consumer of mechanical energy while it is in the braked state.

The mode of operation is thus the opposite from that in the "automotive control" of a pump in which the stroke volume per revolution is reduced when the r.p.m. drops.

If the hydraulic motor is to be able to operate in "4-quadrant operation", i.e., be able to both drive and brake (absorb rotation energy) in each of the two possible directions of rotation, special refinements of the control mechanism must be provided. Refinements expedient for this are given in subclaims 2-5.

It is necessary to avoid regulation fluctuations in all such systems. Measures for solving this subordinate problem are given in subclaims 6-11. These refinements are particularly advantageous in an embodiment of the control system according to FIG. 1 and the characterization of claim 1. However, they can also be used in other control and regulating systems for controlling the r.p.m. of hydraulic motors connected to a pressure line, provided the regulating or control system has the elements or components on which the damping mechanism acts.

In the foregoing description we have set out certain objects, purposes and advantages of this invention. Other objects, purposes and advantages of this invention will be apparent from a consideration of the following description and the accompanying drawings in which.

Figure 1:
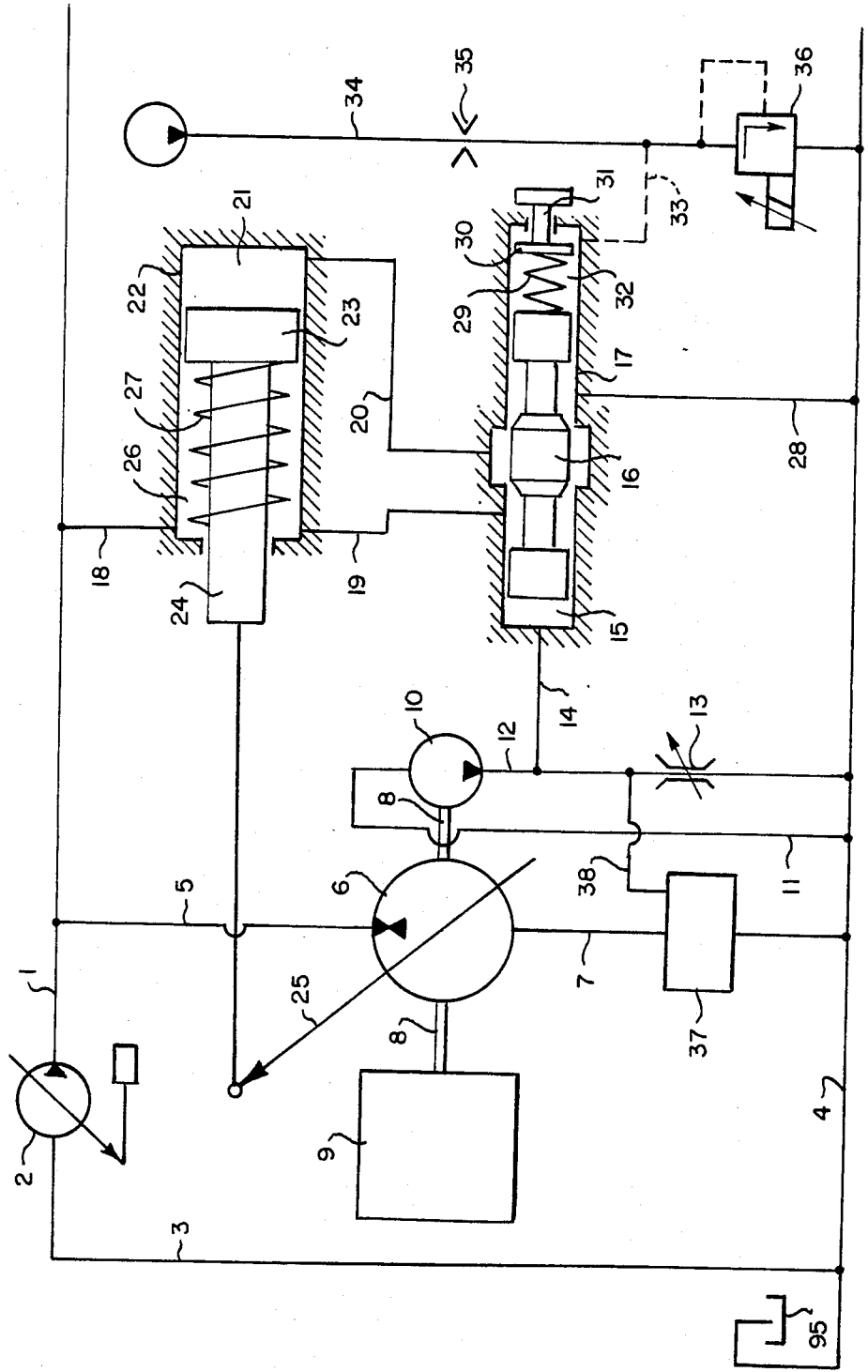
FIG. 1 shows the circuit diagram for a simple embodiment of an overall arrangement.

Referring to the drawings, a pressure main line 1 is connected to a pump 2 that is set at a constant feed pressure and which draws through a line 3 from the low-pressure line 4, which is connected to a pressureless tank 95 and is designed through a pretensioned valve (not shown in the drawing) or in that the tank 95 is higher than the line 4 so that the line is always filled with fluid.

A branch line 5 is connected to the pressure main line 1; it leads to an adjustable hydraulic motor 6 whose drain line 7 is in turn connected to the low-pressure line 4. A mechanical energy consumer 9 is connected to the shaft 8 of the hydraulic motor 6.

On the other hand, an auxiliary control pump 10 is connected to the shaft 8 of the hydraulic motor 6; it draws through a line 11 from the low-pressure line 4 and feeds into a control pressure feed line 12, in which an adjustable restrictor 13 is located. A branch line 14 is connected to the control pressure feed line 12 between the auxiliary control pump 10 and the restrictor 13; it leads to a pressure chamber 15 in which the front face of a regulating valve piston 16 is acted upon. The latter leads to a regulating valve 17.

A line 18 is also connected to the pressure main line 1; it leads through a line 19 to a connection of the regulating valve 17, to the second connection of which a line 20 is connected. It in turn leads to the pressure chamber 21 of the regulating cylinder 22, in which a regulating piston 23 is capable of sliding. The final control element 25 of the adjustable hydraulic motor 6 is connected to the rod 24 of piston 23. The pressure chamber 26 on the piston-rod side, in which a pressure spring 27 is located, is connected to the line 18, 19. The pressure spring 27 normally urges piston 23 to the right, viewing FIG. 1. A line 28, which in turn is connected to the low-pressure line 4, is connected to the third connection of the regulating valve 17. The piston 16 is capable of sliding against a spring 29, which, on the other hand, is supported against a spring plate 30, which is adjustable through a threaded support 31 for changing the pretension of the spring 29. Spring 29 normally urges piston 16 to the left, viewing FIG. 1. The pressure chamber 32, in which the spring 29 is located, is connected through a line 33 to a line 34 between a restrictor 35 and an arbitrarily adjustable pressure-regulating valve 36.

A safety valve 37 is built into the line 7; it is, on the other hand, connected through a line 38 to the control pressure feed line 12 in front of the restrictor 13.

The mode of operation is as follows: pressure medium is fed into the pressure main line 1 by the pump 2 and flows from there through the line 5 to the hydraulic motor 6, which drives the consumer 9 through the shaft 8. The pressure medium draining out flows through the line 7 into the low-pressure line 4. The rated r.p.m. of the hydraulic motor 6 is determined by the setting imposed on the restrictor 13 and/or by the pretension given spring 29 and/or by the pressure in line 33 arbitrarily set by means of valve 36. The r.p.m. of the motor 6 is regulated so that if the consumer 9 receives an increasing torque from the shaft 8 with increasing r.p.m., the hydraulic motor 6 is always regulated so that the ratio between the pressure in line 5 and the torque at shaft 8 is regulated so that the torque in shaft 8 precisely matches the torque absorbed by the consumer 9. If the torque absorbed by consumer 9 drops or the pressure in the pressure main line 1 increases and consequently in line 5 also, the r.p.m. of hydraulic motor 6 increases and thus the r.p.m. of the auxiliary control pump 10 and thus its delivery stream, but thus also the pressure retained in front of the restrictor 13, which pressure is distributed over the line 14 into the pressure chamber 15 and acts here on the front face of regulating piston 16, which is shifted (to the right in the drawing) against the force of spring 29 (displacement path $x_v$). A connection is thus produced in the regulating valve 17 between the line 19 and the line 20 and thus pressure medium can flow from the pressure main line 1 under the pressure prevailing in it through the lines 18, 19 and 20 into the pressure chamber 21 and thus displace the regulating piston 23 to the left in the drawing, such that the setting member 25 of the hydraulic motor 6 is adjusted through the piston rod 24 so that its stroke volume per revolution is decreased and thus the torque at the shaft 8 is reduced at the given pressure in the line 5 so that the r.p.m. of the hydraulic motor 6 drops, taking into consideration the torque absorbed by the consumer 9.

Inversely, if the hydraulic motor 6 runs more slowly than regulated by the rated-value signal transmitters 13, 29 and 36, the pressure head in front of the restrictor 13 decreases and thus the regulating piston 16 is shifted to the left in the drawing under the force of the spring 29 and establishes a connection between the line 20 and the line 28 so that pressure is released from the pressure chamber 21 of the regulating cylinder 22 and the regulating piston 23 is displaced to the right in the drawing under the effect of the spring 27 and the pressure acting in pressure chamber 26 (displacement path: y) and modifies the setting of the final control element 25 of the hydraulic motor 6 so that the ratio between the pressure in line 25 and the torque at shaft 8 and thus the torque of the latter are increased and consequently the hydraulic motor 6 is again accelerated until an equilibrium is reached between the torque of hydraulic motor 6 and the torque absorbed by the consumer 9.

The rated r.p.m. can be changed by modifying the setting of restrictor 13 or by changing the pretension of spring 29 or by varying the pressure at which the valve 36 is set. Of course, it is also sufficient if one of these devices 13 or 31 is present for 29 or 36 if one does not desire a favorable opportunity of superimposing two or three control signals on each other to influence the r.p.m. of the hydraulic motor 6.

In another embodiment (not shown in the drawing) the suction line 11 of the auxiliary control pump 10 is connected to the pressure main line 1 for the case where a decreasing pressure acting on the control valve 17 is desired in the case of increasing r.p.m. In that case, the adjustable restrictor must be installed in the suction line, where the connection to the pressure chamber of the control valve between the restrictor and the auxiliary control pump is again made. In this case, the auxiliary control pump draws from the line beyond the restrictor and decreases the pressure beyond it at increasing r.p.m. Since the auxiliary control pump is connected between the pressure main line 1 and the low-pressure line 4 here, it imparts an additional moment to shaft 8. In yet another embodiment it can also be provided that both the suction line of the auxiliary control pump and the control pressure feed line of the auxiliary control pump are connected to the pressure main line 1 beyond the restrictor, where the connection to the pressure chamber of the control valve is again established between the auxiliary control pump and the restrictor. In this case, the regulating device operates with a higher pressure level at which fluctuations in the pressure of the pressure main line 1 are simultaneously taken into account. Other embodiments are also possible for the control valve 17. The essential point is that if the hydraulic motor 6 runs too fast, its setting is changed in the direction to a smaller stroke volume per revolution.

Figure 2:
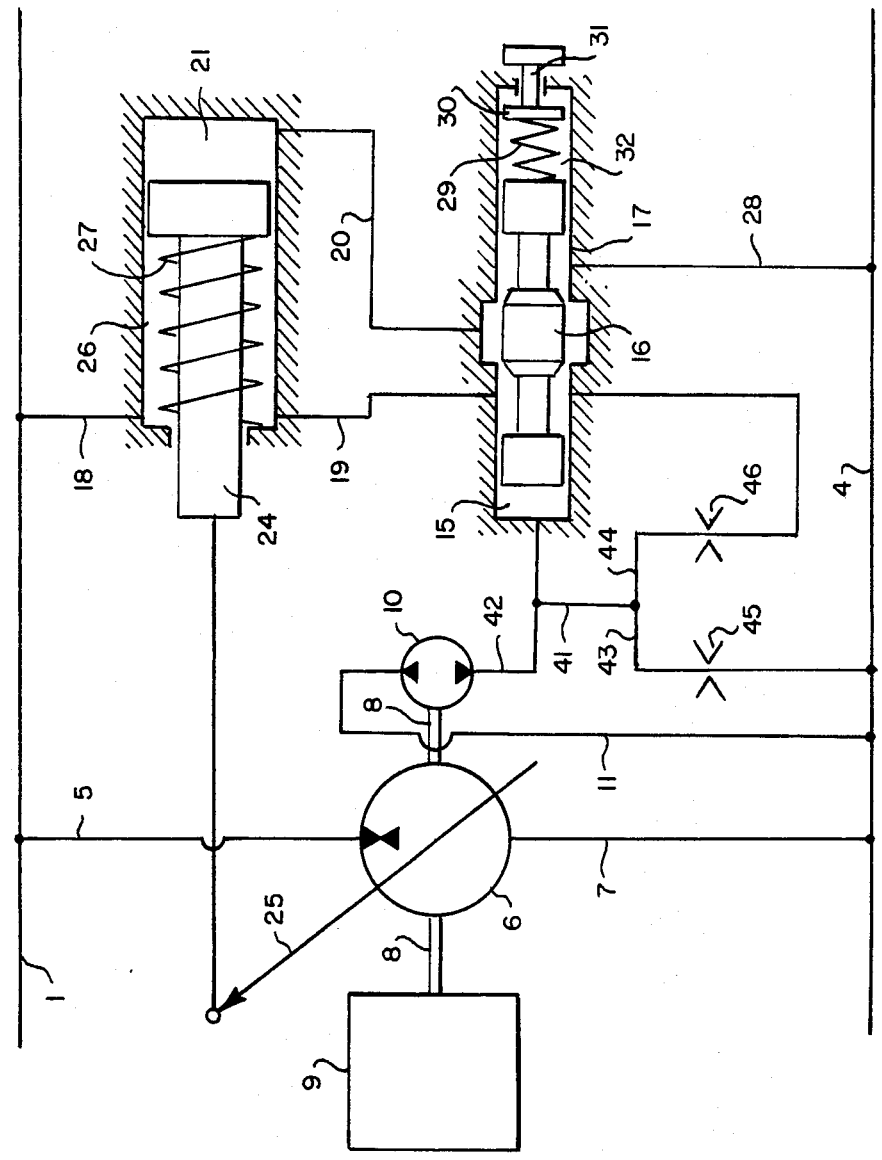
FIG. 2 shows the circuit diagram for a variant of FIG. 1 for 4-quadrant operation.

In the embodiment according to FIG. 2 all the components that bear the same reference number as the components in FIG. 1 are identical to them.

The difference consists in the fact that a branch line 41 is connected to the delivery line 42 of the auxiliary control pump 10, which is connected to the pressure chamber 15. Two lines 43 and 44 are connected to the branch line 41, in which case a restrictor 45 is located in line 43 and a restrictor 46 is located in line 44. Line 43 is connected to the low-pressure line 4 and line 44 is connected through the lines 19 and 18 to the pressure main line 1.

The mode of operation is as follows: the auxiliary control pump 10 builds up a control pressure against a hydraulic bridge half-member 44, 46, 43, 45, 41 that corresponds to a quite specific r.p.m. of the hydraulic motor 6 in the case of fixed (constant) restrictors 46 and 45. Specification of the rated value for the r.p.m. of the hydraulic motor 6 can also be effected hereby by varying the pretension of the spring 29 or by feeding a control pressure into the pressure chamber 32.

It is expedient to design the two restrictors 45 and 46 to have an identical action. If no pressure is present in the pressure chamber 32 and the pretension of spring 29 is selected so that the control valve 16 is in its closed position, if the pressure in pressure chamber 15 corresponds precisely to half the pressure gradient between the pressure main line 1 and the low-pressure line 4, the final control element 25 of the hydraulic motor 6 is regulated by the regulating device so that the delivery stream of the auxiliary control pump 10 generates this pressure in the pressure chamber 15. In the case of identical restrictors 45 and 46 this corresponds precisely to zero r.p.m. since the pressure can only be held at this level if the auxiliary control pump 10 feeds no pressure medium into the measuring circuit or draws any from it. Since the two restrictors 45 and 46 are connected one behind the other and are identical, the pressure in line 41 is precisely half as great as in the pressure main line 1 relative to the pressure gradient compared with the low-pressure line 4. Now if the pretension of spring 29 is changed so that a greater pressure is required in pressure chamber 15 to hold the control valve 17 in the closed position, the auxiliary control pump 10 must force pressure medium into the delivery line 42 in order to generate this pressure, that is, the hydraulic motor 6 must run with a corresponding r.p.m. in the corresponding direction of rotation.

Inversely, if the pretension of spring 29 is selected so that control valve 17 is in the closed position only if the pressure in pressure chamber 15 is less than half the pressure gradient between the pressure main line 1 and the low-pressure line 4, the final control element 25 of the hydraulic motor 6 is deviated such that this smaller pressure builds up in the control pressure feed line 42, in which case the hydraulic motor 6 must now run in a different direction of rotation than in the case just described, since in order to generate this lower pressure the auxiliary control pump must draw from the control pressure feed line 42. In this case also the r.p.m. of the hydraulic motor 6 is prescribed by the degree of pretensioning of spring 29.

Figure 3:
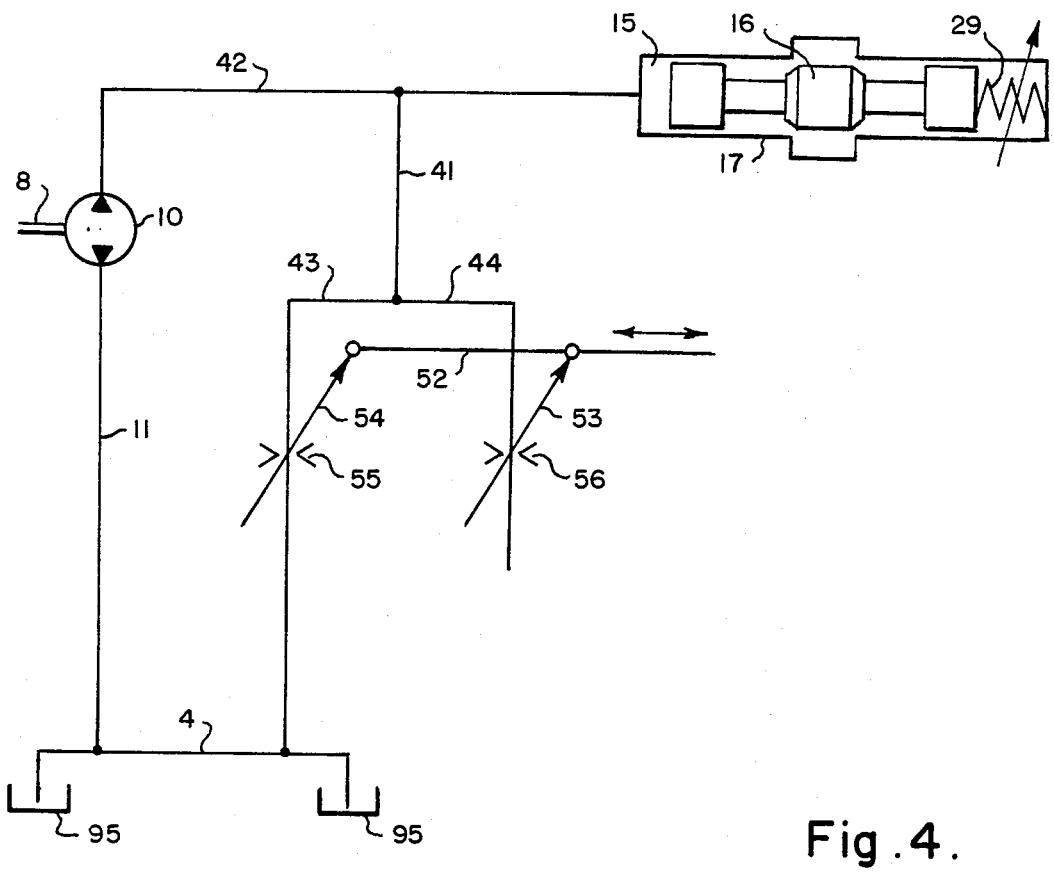
FIG. 3 shows a section of the circuit diagram according to FIG. 2 with two adjustable pressure-regulating valves.

The nonlinear stream-pressure gradient relationship of the restrictors 45 and 46 and the change thus resulting in the circuit intensification, e.g., at high rated r.p.m. values of the hydraulic motor 6, can be effected in the case of adjustable restrictors by a synonymous change in the setting of restrictors 45 and 46. A corresponding embodiment is shown in FIG. 3, in which the components with the same reference numbers are again the same as the components with the same reference numbers in FIGS. 2 or 1. The embodiment in FIG. 3 differs from that in FIG. 4 in that adjustable restrictors 55 and 56 are provided instead of the constant restrictors 45 and 46. The final control elements 54 and 53 of restrictors 55 and 56 are coupled together through a coupling rod 52 for synonymous regulation.

Figure 4:
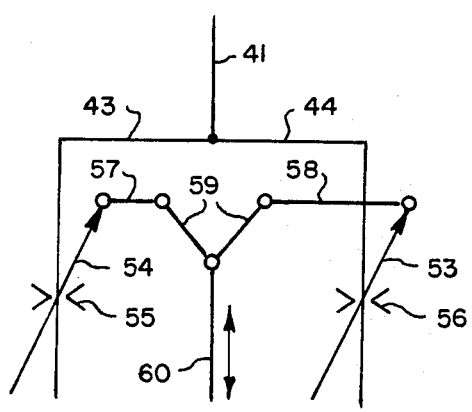
FIG. 4 shows schematically a variant of a section from FIG. 3 with two pressure-regulating valves adjustable in the opposite direction.

In the embodiment according to FIG. 4, in order to be able to specify the rated r.p.m. in both directions of rotation the final control elements 54 and 53 of restrictors 55 and 56 are connected with the connecting rods 57 and 58 and the elbow lever system 59 to the adjusting rod 60 so that the restrictors 55 and 56 are synonymously adjusted when the adjusting rod 60 is displaced. In this case the r.p.m. regulating device regulates the final control element 25 of the hydraulic motor such that the auxiliary control pump 10 maintains the pressure in pressure chamber 15 constant in accordance with the value established by the pretension of spring 29. If the pretension of spring 29 is selected so that the control valve 17 is in the closed position if the pressure in pressure chamber 15 is half as great as the pressure in the pressure main line 1, the two restrictors 55 and 56 must again be set to an identical value, in which case the zero r.p.m. of the hydraulic motor 6 and thus of the auxiliary control pump 10 is established, i.e., this setting of the rated value corresponds to the stoppage of the hydraulic motor 6, regardless of whether a load is received at its shaft 8 or not. Now if the adjusting rod 60 is displaced so that restrictor 55 is widened and restrictor 56 is constricted, the auxiliary control pump 10 must draw from line 42 in order to maintain the pressure constant in pressure chamber 15, i.e., in order to make sure that control valve 17 is in its closed position, that is, the hydraulic motor must rotate with a prescribed r.p.m. in such a direction that the auxiliary control pump 10 draws from the control pressure line 42. Now if the hydraulic half-bridge is further modified by giving the restrictor 55 a wider setting and constricting restrictor 56 to a narrower setting due to the coupling of final control elements 54 and 53, the auxiliary control pump 10 must pump a volume stream into the control pressure feed line 42 in order to maintain the pressure in pressure chamber 15 constant. For this purpose, the hydraulic motor 6 must run in the opposite direction of rotation, such as that in which the auxiliary control pump 10 draws from the control pressure feed line 42. In this type of rated r.p.m. specification the intensification of the measuring circuit is modified in accordance with the performance graph of the system consisting of the restrictors 55 and 56.

Figure 5:
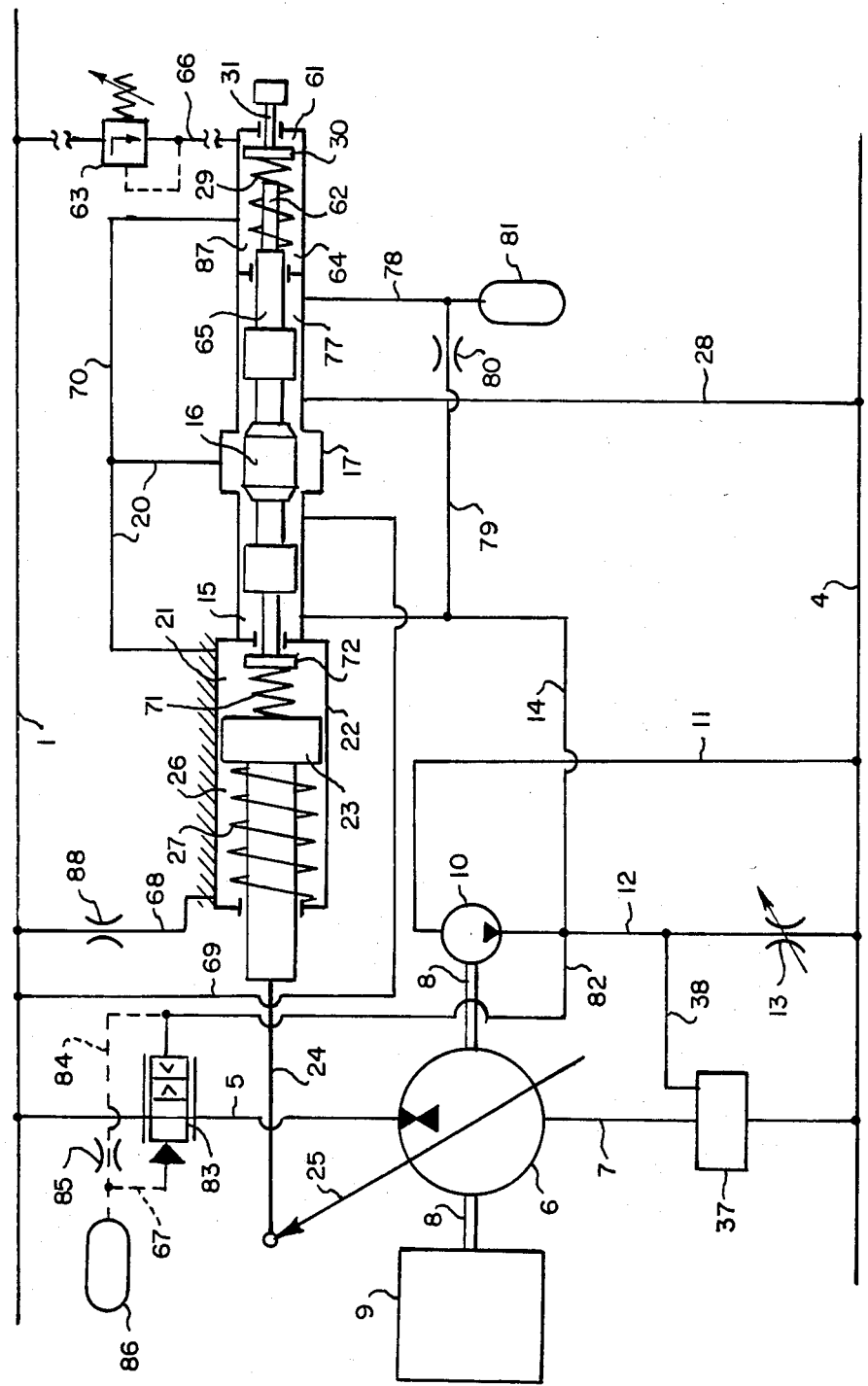
FIG. 5 shows an overall circuit diagram with five different damping devices.

In the embodiment according to FIG. 5 the components that are identical to the components in the preceding figures are again given the same reference numbers as there. In the embodiment according to FIG. 5, however, the pressure chamber 26 of the regulating cylinder 22 is connected through a line 68 with the pressure main line 1 and at the site of the piping system 18, 19 in the embodiment according to FIG. 1 the line 69 in the embodiment according to FIG. 5 has pressure for supplying the control valve 17.

The regulating piston 16 is installed coaxially to the regulating piston 23 in the embodiment according to FIG. 5 also. The pressure chamber 61, in which an extension 62 of the regulating piston 16 is capable of sliding, can be loaded with pressure by means of an arbitrarily adjustable pressure-regulating valve 63 so that it thus becomes possible to feed a control pressure signal into the regulating system in which case the control pressure valve 63 is connected through line 66 to the pressure chamber 61. The extension 62 is connected through an extension 65 with the regulating piston 16, in which case the extension 62 has a smaller diameter than extension 65, where the annular surface on the face of extension 65 is acted upon in the pressure chamber 64, which is connected through line 70 to line 20.

In the circuit diagram of FIG. 5, designated as an implementation example, various measures are simultaneously provided alongside each other for damping the regulation fluctuations (one would utilize only one of them in practical application).

Figure 6:
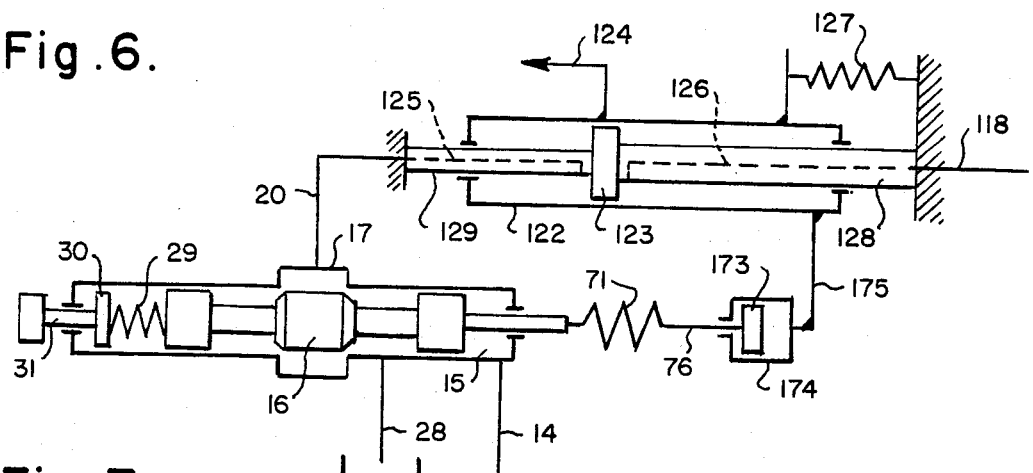
FIGS. 6 through 8 each schematically show an individual damping device.

As the first device for damping, a spring 71 is provided which, on the one hand, rests against the regulating piston 23 and on the other against an extension 72 at the regulating piston 16 (such a spring between a control valve piston or regulating valve piston and working piston or adjusting piston for position indication through the compression-dependent force of the spring is known in itself: DE-OS No. 19 55 926). This spring effects a forceful return of the regulating path of the control piston 23 on the pilot path of the regulating piston 16. By means of the arrangement given in this implementation example, in which the control piston is arranged coaxially to the regulating piston 6, the spring 71 can be installed and tensioned in a simple manner between an extension 72 of the regulating piston 16 and the control piston 23. If the feedback is to be only dynamically operative in order to avoid stationary errors, a damping element can be connected in series with the spring. An implementation example of this is presented in FIG. 6.

The control valve 17 with the regulating piston 16 and the regulating spring 29 is the same as in the preceding Figures. In this case, however, the control cylinder is capable of sliding, where the portion 128 of larger diameter of the piston rod is mounted solid to the housing and has a bore hole 126 that is connected to a line 118, which in turn can be connected to the pressure main line 1. The control piston 123 separates two pressure chambers in the control cylinder 122, of which the portion 128 of larger diameter of the piston rod extends into one chamber and the portion 129 of smaller diameter extends into the other. The control cylinder 122 is connected through the member 124 with the control element 25 of the hydraulic motor (not shown in FIG. 6). A spring 127 can be tensioned between the housing and the control cylinder 122.

The damping piston 173 is capable of sliding with a slight play that causes a throttling action in the damping cylinder 174, which is rigidly connected through the transfer element 175 with the control cylinder 122. The damping piston 123 is connected through the coupling rod 76 with the spring 71 (in case the feedback is to act not only dynamically, the rod 76 can be connected directly with the element 175 and correspondingly the damping cylinder 174 with the damping piston 173 drop out).

Figure 7:
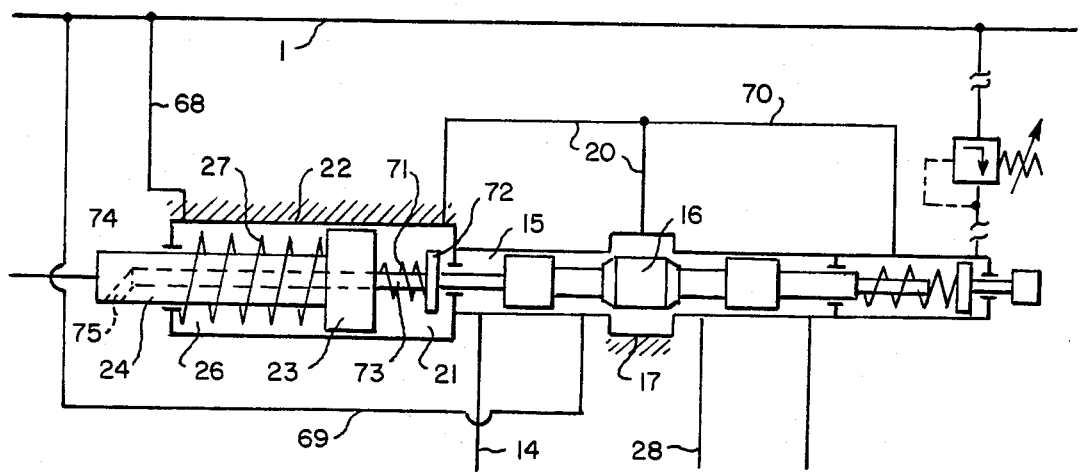

In the embodiment according to FIG. 5 it must be taken into account that the pressure in the pressure chamber 21 acts on the front face of the extension on the regulating piston 16 that passes through the wall of pressure chamber 21 and thus would produce a falsifying force perturbing the control function if an equal counterforce is not produced in the pressure chamber 87, which is acted upon through the lines 20 and 70 by the same pressure. In order to avoid this shortcoming, it is provided in the embodiment shown in FIG. 7 that an extension 73 with the same diameter as the extension that passes through the front wall of the pressure chamber 21 dips into a bore hole of the adjusting piston 24, which is relieved of pressure through a bore hole 75.

Figure 8:
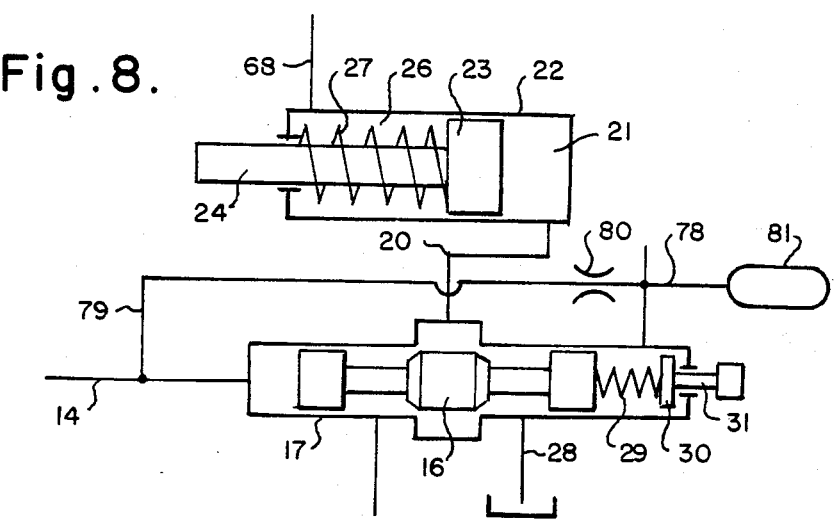

A second damping device is shown in FIG. 5. It is designed with a pressure chamber 77 at the control valve 17, where the pressure acting in this pressure chamber 77 acts on the annular face of the regulating piston 16 (on the right in FIG. 5). A line 78 is connected to this pressure chamber 77; line 78 is also connected to a line 79, which in turn is connected to the line 14, which leads to the pressure chamber 15. A restrictor 80 is located in line 79 and a pressure reservoir 81 is connected to the line 78. These components form a hydraulic timing circuit. These components are also indicated in FIG. 8. The restrictor 80 forms a hydraulic resistance and the pressure reservoir 81 forms a hydraulic capacity. These components serve to build up a delayed pressure in pressure chamber 77. The time constant of this pressure buildup is given by the magnitude of the resistance in the restrictor 80 and the volume in pressure reservoir 81.

In the embodiment shown in FIG. 1 the measuring pressure retained in front of the restrictor 13 acts in the pressure chamber 15 of regulating valve 17, while the pressure chamber 32 on the opposite side of regulating piston 15 is relieved of pressure, provided an additional pressure signal is not arbitrarily applied. There is thus an "intensification" of the control valve by the size of the left-hand face of the regulating piston 16 and the stiffness of spring 29. Because a high "intensification" leads to instability, the pressure in pressure chamber 77, which is built up in a delayed manner through the restrictor 80, acts according to this second damping device on the annular face (to the right in the drawing) of the regulating piston 16. In the stationary state, i.e., at equilibrium and corresponding stoppage at the regulating piston 16, the measuring pressure retained in front of the restrictor 13 lies on both sides of the regulating piston 16, but the face is larger on the left-hand side of the face in the drawing. However, if the pressure retained in front of the restrictor 13 varies very rapidly as the result of a variation in the r.p.m. of the hydraulic motor 6, this pressure change acts very rapidly in pressure chamber 15 on the lefthand side of regulating piston 16 in the drawing, while due to throttling in the restrictor 80 the pressure acting up to this moment still acts in pressure chamber 77. The "intensification" in the control valve is thus high. A high dynamic intensification can thus be achieved with the appropriate selection of the time constant given by the product of resistance in restrictor 80 and reservoir capacity 81, while in the stationary state only the intensification due to the same pressure on both sides is active on the differential surface resulting from the faces of different size on the two sides of regulating piston 16. A differentiating behavior of the control valve 17 results from the fact that the measuring pressure retained in front of the restrictor 13 acts through the restrictor 18 only in a delayed manner on the regulating piston 16 face on the right in the drawing.

A third device for damping fluctuations is offered by connecting a line 82 to the control pressure feed line 12 between the auxiliary control pump 10 and restrictor 13. This line 82 leads to a control pressure chamber of a 2-position/2-connection valve (2/2 valve) 83, which is installed in line 5. A branch control line 84 leads from line 82 through a restrictor 85 to a pressure reservoir 86, in which case a second control pressure line 67 is connected between the pressure reservoir 86 and the restrictor 85. Valve 83 is designed so that if the same pressure is present in both control pressure chambers of valve 83, a free throughflow through line 5 is permitted, while if a higher pressure is present on the side connected to line 82 than on the side connected to the control pressure line 67, the stream through line 5 is throttled in valve 83.

The mode of operation of this third damping arrangement is as follows: with a rapid rise in the r.p.m. of hydraulic motor 6 and thus a sudden increase in the delivery stream of the auxiliary control pump 10, the pressure head in front of restrictor 13 rises suddenly and is transferred through the control pressure feed line 12 and line 82 to the side of valve 83 on the right in the drawing, while on the left side of this valve the pressure in the control pressure line 67 can increase only very slowly because a pressure rise is delayed since only a throttled stream can flow through restrictor 85; this stream flows into the reservoir 86 and the pressure can rise only slowly due to the small stream flowing in there. As a result, the stream flowing to the hydraulic motor 6 is throttled and thus at least a further increase in the r.p.m. of hydraulic motor 6 is inhibited, if this r.p.m. does not even drop before valve 83 again opens. A serial network is thus offered by the components 82–86. However, this damping arrangement has the disadvantage that the stream flowing to the hydraulic motor 6 under high pressure must be immediately throttled, though only briefly and slightly. In any case, an excessively rapid r.p.m. increase is thus damped and thus the cause of fluctuations. If it is desirable to achieve a damping effect with an analogous arrangement when the r.p.m. drops also, the main stream flowing to the hydraulic motor 6 should be continuously throttled and this throttling effect should be switched off when the r.p.m. drops. With regard to the losses occurring during most of the operating time, such an arrangement is apparently less to be recommended even if it is possible to utilize the dynamically accumulating pressure head immediately in front of valve 83 when the latter is suddenly throttled in order to achieve an additional control effect at a throttling valve equivalent to valve 83. With this damping arrangement, as a function of the speed with which the pressure head increases in front of restrictor 13, the delivery cross section in line 5 to hydraulic motor 6 is reduced and thus a pressure drop is effected in valve 83, such that less energy flows to hydraulic motor 6. Here too, there must be an appropriate coordination between the size of restrictor 85 and the volume of reservoir 86 for correct adjustment. In the stationary state, valve 83 is fully open.

A fourth damping possibility is offered by conveying the control pressure present in line 20 and thus in pressure chamber 21 of the regulating cylinder 22 through line 70 onto an annular surface on the side of regulating piston 16 on the right in FIG. 5 in the pressure chamber 87, in which case line 70 is connected to line 20 and also to this pressure chamber 87. The force acting in pressure chamber 87 on the annular face of regulating piston 16 is an auxiliary control valve, which acts on the piloting as an acceleration feedback of the adjusting piston. The sign of the feedback is dependent on which side of the regulating piston 16 the surface acted upon by the pressure standing in line 20 is provided. It must be taken into account in laying out the arrangement that the force acting on the annular surface must be considered in plotting the rated value setting.

A fifth damping measure results from the fact that the velocity of fluid inflow and outflow from and into the adjusting cylinder 22 is limited by a restrictor. In the implementation example this restrictor 88 is provided in line 68, through which fluid flows into and out of the pressure chamber on the piston rod-side of the adjusting cylinder 22. This damping arrangement is located at the optimal site in the system and consist in principle in feeding back the regulating speed to the force summation point of the regulating cylinder. Energy is removed from the regulation process and thus the regulating speed is limited by the pressure drop during flow through the restrictor 88.

The safety valve arrangement 37 in both the device according to FIG. 1 and that according to FIG. 5 serves to prevent inadmissible r.p.m. values at hydraulic motor 6, which can occur for example if no more torque is suddenly accepted from hydraulic motor 6 when it is set at the maximum absorption volume or if the pressure in the inflow line 5 suddenly increases very sharply, or a disturbance occurs in the regulating arrangement, for example, a control pressure line springs a leak. In each such case of an inadmissibly high r.p.m. of the hydraulic motor 6 an excessively high stream flows out through line 7, which is throttled by the throttle valve arrangement 37, such that energy is removed in the throttle valve arrangement 37 and cannot flow to the hydraulic motor 6 since the pressure gradient in the latter is reduced because a higher pressure is retained in line 7 and thus the pressure gradient between lines 5 and 7 is modified. Since the maximum permissible stream flowing in line 7 is dependent on the setting given the hydraulic motor 6, the pressure retained in the control pressure feed line 12 in front of restrictor 13 is fed through line 38 as a signal for this setting in the safety valve arrangement 37.

In the foregoing specification we have set out certain preferred practices and embodiments of our invention, however, it will be understood that this invention may be otherwise embodied within the scope of the following claims.

We claim:

1. A control and regulating arrangement for an adjustable-hydrostatic unit including at least one adjustable hydraulic motor comprising adjusting means on said motor regulating the output thereof, a connection from said hydraulic motor to a load to be driven by said hydraulic motor, a substantially constant high pressure hydraulic source adapted to supply at least one or more motors, a direct connection from said high pressure hydraulic source to said motor, regulating means for said hydraulic motor, said regulating means including a control pressure pump driven by said hydraulic motor in common with the load being driven, a low pressure line spaced from the high pressure line, a first connection delivering fluid to said control pressure pump from said low pressure line, a second connetion between said control pressure pump and the low pressure line returning pressure fluid to the low pressure line from the control pressure pump, a first regulating cylinder spaced from said control pump, first piston means in said cylinder, a branch line from said second connection to said cylinder, restrictor means in said second connection between the low pressure line and the branch line whereby the pressure fluid between the pump and restrictor acts on one side of the piston to move it in the regulating cylinder, a resilient means in the cylinder acting on the piston opposing said pressure fluid action, a second regulating cylinder spaced from the first cylinder, a second regulating piston in said second cylinder connected to said adjusting means on the adjustable hydraulic motor, resilient means normally urging said adjusting means to produce minimum stroke volume, a connection between said first and second cylinder whereby when said first regulating piston is moved against the resilient means in the first cylinder fluid is delivered to the second cylinder to move the control piston against the resilient means in the second cylinder to move the adjusting means to control the stroke volume in accordance with the pressure from the control pump.

2. Control and regulating arrangement according to claim 1, characterized in that a second branch line is connected to the second connection in front of the restrictor in parallel with the branch line leading to the first regulating cylinder in which the regulating piston is capable of sliding the second branch line being connected to the connection from the high pressure line to the motor carrying the pressure medium to the hydraulic motor, and a second restrictor located in this second branch line.

3. Control and regulating arrangement according to claim 2, characterized in that the two restrictors have an identical action.

4. Control and regulating arrangement according to claim 2 with adjustable restrictors, characterized in that the two restrictors are connected together for synonymous actuation.

5. Control and regulating arrangement in accordance with claim 1 with a control unit in which the first regulating piston, loaded by the pressure retained in front of the restrictor and capable of sliding against the force of a resilient means in the form of a spring actuates a regulating valve that controls the loading of the second regulating cylinder in which the regulating piston slides against a resilient means, and wherein at least one member of the control unit is in operative connection with a vibration-damping device (71–75 or 77–79 or 82–86 or 70, 87 or 88).

6. Control and regulating arrangement according to claim 5, characterized in that the first regulating piston loaded by the pressure retained in front of the restrictor is coaxial with and supported against the second regulating piston by means of a spring.

7. Control and regulating arrangement according to claim 5, characterized in that a branch line is connected to the second connection between the control pressure pump and the low pressure line carrying the pressure retained in front of the restrictor, which branch line is connected to a pressure chamber at the other side of the first regulating piston loaded by the pressure retained in front of the restrictor, and a second restrictor located in this branch line, and a pressure reservoir connected to the line between this restrictor and the pressure chamber at the other side of the first regulator piston.

8. Control and regulating arrangement according to claim 5, characterized in that a hydraulically controlled 2-position/2-connection valve is installed in the line between the high pressure hydraulic line and the hydraulic motor which valve leaves the said line in the open unthrottled position in the one switching position and leaves the said line open, but throttled in the other switching position, in which case a control pressure chamber of said valve shunting in the direction of the throttled position is connected to the second connection from the control pump to the low pressure line and an opposite pressure chamber of said valve is connected to a pressure reservoir, which is in turn connected to the second connection from the control pump to the low pressure line through an additional restrictor.

9. Control and regulating arrangement according to claim 5, characterized in that the regulating piston loaded by the pressure retained in front of the restrictor in the second connection from the control pump to the low pressure line is provided with a smaller surface on the side facing away from the retained pressure and that this surface is acted upon by the pressure acting on the regulating piston.

10. Control and regulating arrangement according to claim 5, characterized in that a pressure chamber of the second regulating cylinder is connected through a damping restrictor to another line.

11. Control and regulating arrangement according to claim 10, characterized in that the connected pressure chamber of the second regulating cylinder is the pressure chamber on the piston-rod side and that it is connected through a damping restrictor to the high pressure hydraulic line.

12. Control and regulating arrangement according to claim 2, characterized in that a pressure-reducing valve is located in the line connected to one of the high pressure hydraulic and the connection from said line to the hydraulic motor carrying the pressure medium to the hydraulic motor in front of a second restrictor.

* * * * *

UNITED STATES PATENT AND TRADEMARK OFFICE
CERTIFICATE OF CORRECTION

PATENT NO. : 4,531,367
DATED : July 30, 1985
INVENTOR(S) : WOLFGANG BACKE, FRANZ WEINGARTEN, HUBERTUS MURRENHOFF It is certified that error appears in the above-identified patent and that said Letters Patent is hereby corrected as shown below:

Column 8, line 45, change "6" to --16--.

Signed and Sealed this

Thirty-first Day of December 1985

[SEAL]

Attest:

DONALD J. QUIGG

Attesting Officer

Commissioner of Patents and Trademarks